Dec. 29, 1931. W. R. BERTELS 1,838,246
GLASS TOP DISPLAY COVER
Filed July 17 1930   3 Sheets-Sheet 1
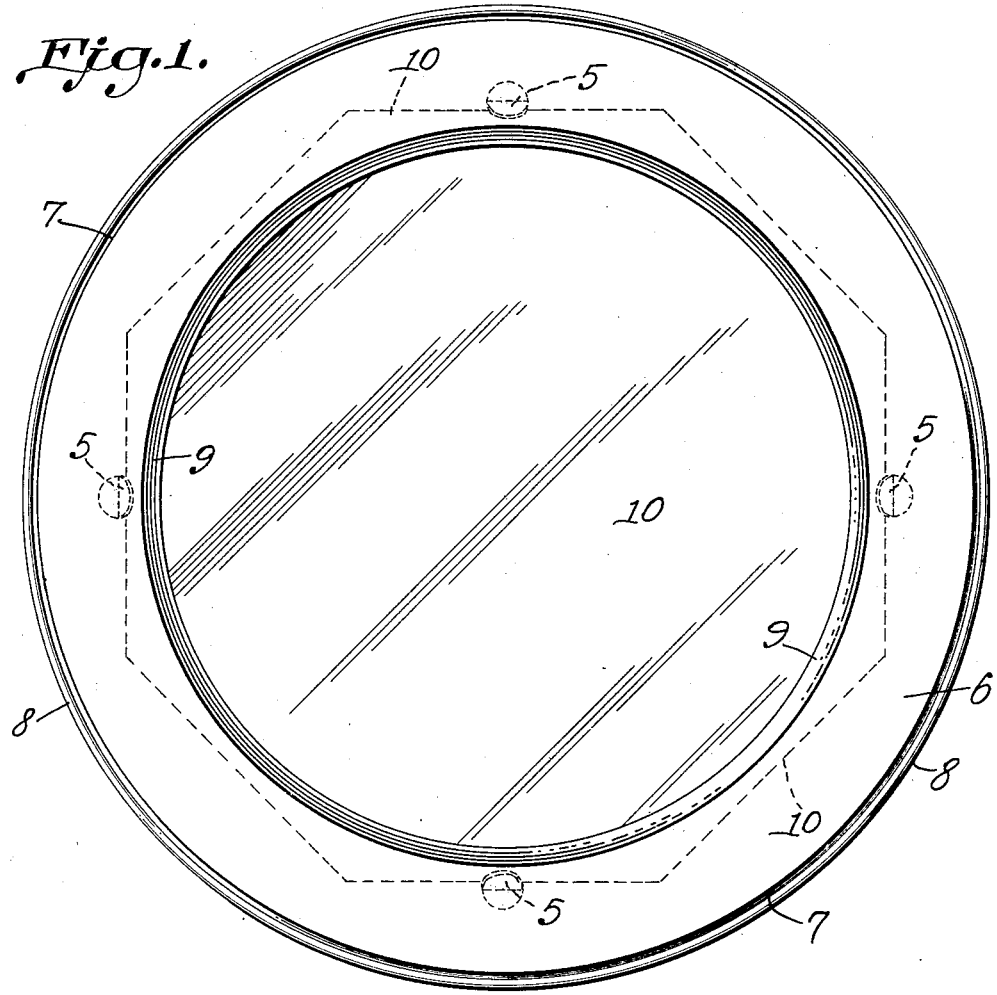
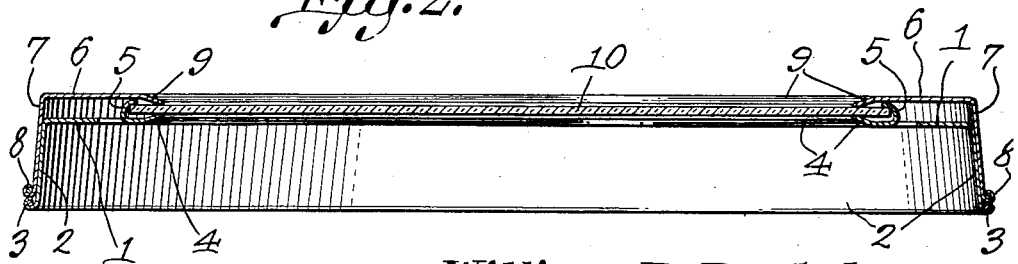
William R. Bertels Inventor Dec. 29, 1931.  W. R. BERTELS  1,838,246
GLASS TOP DISPLAY COVER
Filed July 17 1930    3 Sheets-Sheet 2
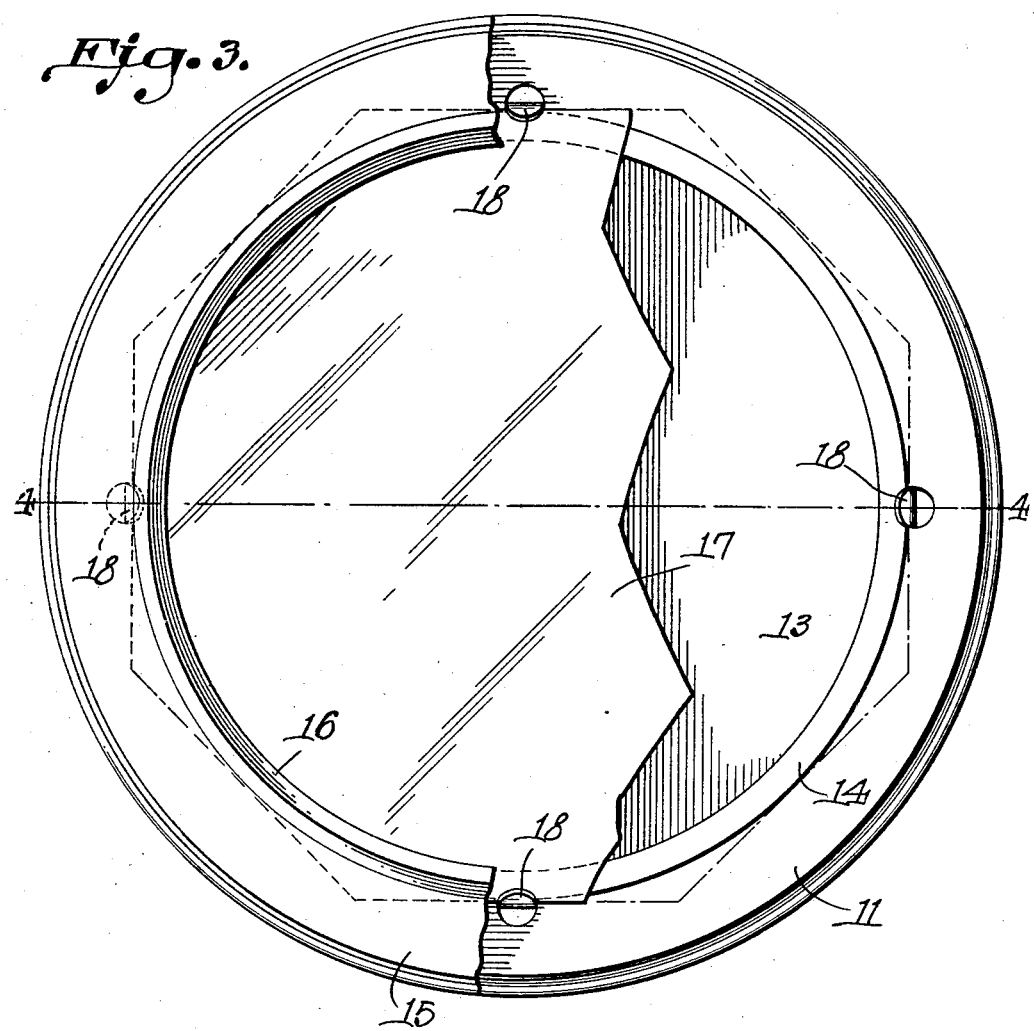
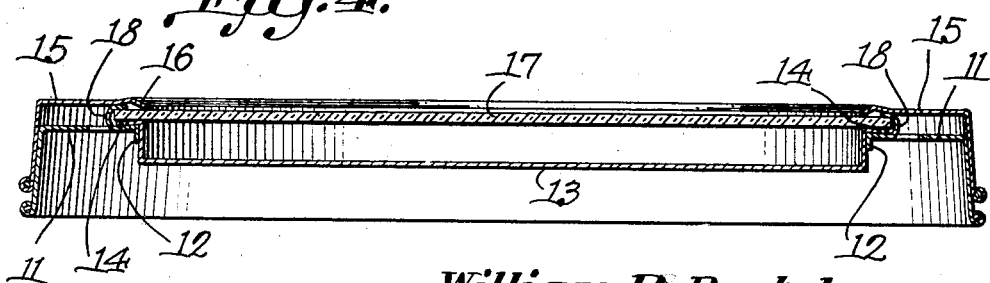
William R. Bertels, Inventor
By C.A.Snow & Co.
Attorneys.

Dec. 29, 1931.   W. R. BERTELS   1,838,246
GLASS TOP DISPLAY COVER
Filed July 17 1930   3 Sheets-Sheet 3

William R. Bertels, Inventor

By C. A. Snow & Co.
Attorneys.

Patented Dec. 29, 1931

1,838,246

UNITED STATES PATENT OFFICE

WILLIAM RAYMOND BERTELS, OF WILKES-BARRE, PENNSYLVANIA

GLASS TOP DISPLAY COVER

Application filed July 17, 1930. Serial No. 468,640.

This invention relates to a display cover for use on containers holding candy, crackers, nuts, and similar merchandise.

One of the objects of the invention is to provide a display cover having a transparent portion or window formed by the use of ordinary window glass which can be cut to angular shape and properly secured in position without requiring the services of a skilled mechanic.

A further object is to provide a cover the parts of which can be easily assembled and taken apart and do not require the use of fastening means for holding them together.

A still further object is to provide a cover which, in addition to the transparent portion, can be formed in two pieces of metal easily shaped by stamping or drawing.

With the foreging and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 1 is a plan view of the cover.

Figure 2 is a section therethrough.

Figure 3 is a view similar to Figure 1 showing another form of cover, a portion being broken away.

Figure 4 is a section on line 4—4, Figure 3.

Figure 5:
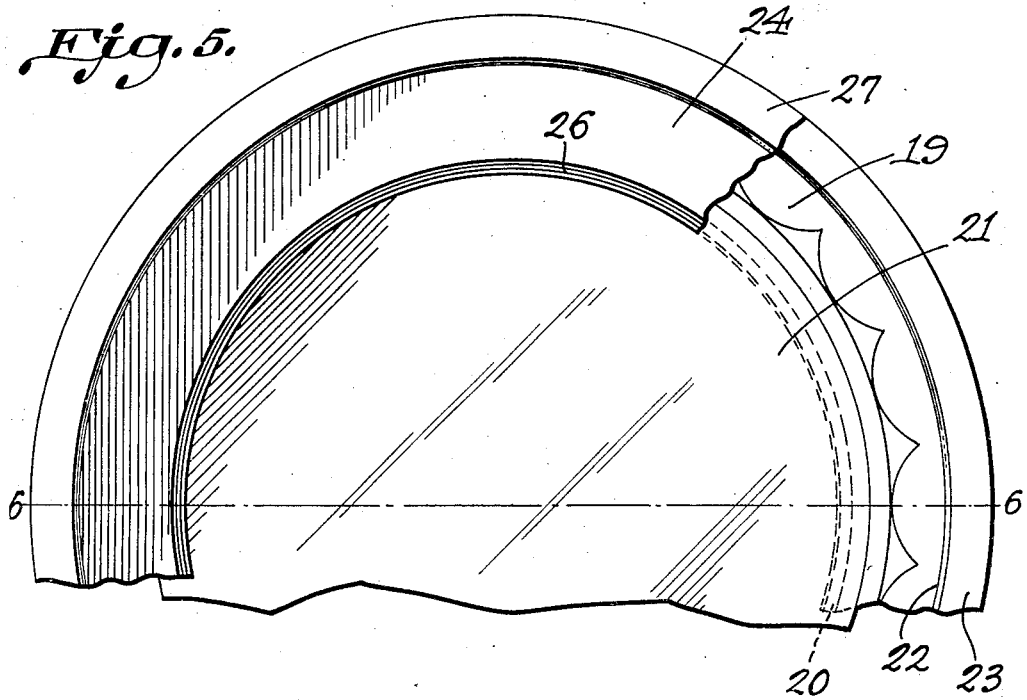
Figure 5 is a plan view of a portion of another modified form of cover.

Referring to the figures by characters of reference 1 designates a sheet metal ring provided, at its outer edge, with an annular flange 2 the free edge of which is preferably formed with a rolled or bead finish as shown at 3. The inner edge of the ring 1 is offset to provide an inclined bearing flange 4 and adjacent to this flange ears 5 are struck outwardly from the ring.

Another sheet metal ring 6 is adapted to overlie the ring 1 and has an annular flange 7 at its outer periphery, the free edge of this flange being preferably formed with a rolled or bead finish as shown at 8. The inner periphery of the ring 6 is offset downwardly to provide a bearing flange 9 which overlies flange 4. The two flanges are adapted to converge.

A glass light 10, which can be ordinary window glass is adapted to completely close the opening defined by the flange 4. Its marginal portion is produced by straight line cuts and the light is so proportioned that when it is seated on the flange 4 certain of the edges thereof will engage the ears 5. These ears are then bent into lapping engagement with the light as shown in the drawings so as to hold the light against displacement relative to the ring. Thereafter the ring 6 is placed over ring 1 and its flange 7, which is tapered, will engage the outer surface of the flange 2 which is also tapered. Thus when the two rings are pressed toward each other the flanges 4 and 9 will tightly grip the light while frictional contact between the flanges 2 and 7 will hold the rings against accidental separation.

Should it be desired to remove or replace the light 10 it is only necessary to insert a screw driver or other suitable object between the edges 3 and 8 so that they can be pried apart and ring 6 thus separated from the ring 1.

Flanges 4 and 9 constitute yielding means for gripping the light.

In the former device shown in Figures 3 and 4 it is possible to support a layer of merchandise within the cover for display purposes. In this structure the ring 11 has a depending flange 12 at its inner periphery and a shallow circular pan 13 is adapted to be positioned within the ring where it will sit snugly against flange 12. This pan 13 has an annular flange 14 adapted to rest on the ring 11. The other ring 15 is made the same as the ring 6 heretofore described and its yieldable bearing flange 16 is adapted to frictionally engage the glass light 17 which is held to pan 13 and its flange 14 by bendable ears 18 corresponding with the ears 5.

In this form of device a layer of merchandise can be placed in the pan 13, the glass 17 laid thereover and fastened by the ears 18, and the ring 15 then forced into frictional engagement with the ring 11.

Figure 6:
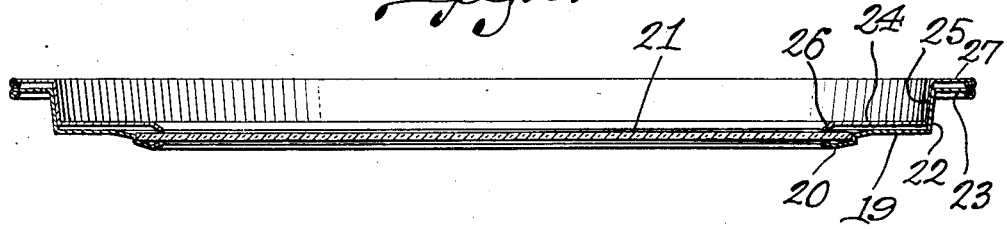
Figure 6 is a section on line 6—6, Figure 5.

In Figures 5 and 6 the cover is shown consisting of a ring 19 the inner periphery of which is offset to provide a yieldable supporting flange 20 preferably angular in cross section as shown. This flange is adapted to support a circular glass 21 which fits into the depression formed by offsetting the ring. An annular flange 22, slightly tapered, is provided at the outer periphery of the ring and has an outstanding rim 23.

A second ring 24 having a slightly tapered annular flange 25, is adapted to be pressed into the recess defined by ring 19 and its flange, and has its inner periphery offset to provide a continuous, yieldable lip 26 adapted to bear on the glass 21. An annular rim 27 is provided on flange 25 and is adapted to overlie rim 23 as shown.

This form of cover is adapted to extend into a container, and the rim 23 will rest on the wall thereof.

Figure 7:
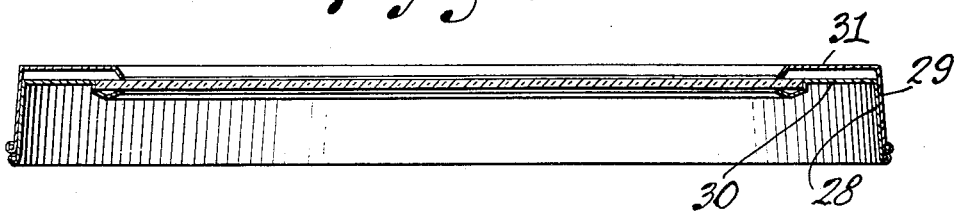
Figure 7 is a view similar to Figure 6 showing another construction.

In Figure 7 there has been shown a container adapted to rest on and extend around the open top of a container. This modified form has the tapered flanges 29 and 28 extending downwardly from the rings 30 and 31 respectively and rims are not necessary. In other respects this form is like that shown in Figures 5 and 6.

A prying element can be forced between the rims 23 and 27 shown in Figure 6 and between the beads 32 shown in Figure 7 when it is desired to force apart the rings.

What is claimed is:

1. A cover including nested one-piece rings having tapered outer flanges for frictional engagement with each other, a transparent member interposed between the rings, and a yielding flange on one of the rings for gripping the transparent member.

2. A cover including nested one-piece rings having tapered outer flanges for frictional engagement with each other, a transparent member interposed between the rings, and means struck from one of the rings for engaging the transparent member to hold it to said ring, and a yielding flange on one of the rings for gripping said member.

3. A cover including nested one-piece rings having tapered outer flanges for frictional engagement with each other, a transparent member interposed between the rings, means on the flanges for receiving a prying element therebetween to separate the flanges and rings, fastening means integral with one of the rings for holding the transparent member thereto, and a yielding flange on one of the rings adapted to grip the transparent member when the outer flanges are in frictional engagement.

4. A cover including nested one-piece rings having tapered outer flanges for frictional engagement with each other, a pan supported by one of the rings, a transparent member interposed between the rings and closing the pan, and means on one of the rings for gripping the transparent member and holding it to the pan.

5. A cover including nested one-piece rings having tapered outer flanges for frictional engagement with each other, a pan seated in one of the rings, a transparent member between the rings and closing the pan, means on the pan-holding ring for holding the transparent member thereto and to the pan, and means on the other ring for binding on the transparent member.

6. In a glazed top for a container, the combination of a primary element having an opening formed therein, a readily detachable secondary element adapted to fit said primary element snugly and having an opening corresponding in position to the opening in said primary element, a transparent element intermediate said primary and secondary elements and extending across said openings, and a resilient flange formed on each of said elements adjacent the edges of the openings formed therein and adapted to flexibly support said transparent element in the container top.

7. In a glazed top for a container, the combination of a primary element having an opening formed therein, a readily detachable secondary element adapted to fit said primary element snugly and having an opening corresponding in position to the opening in said primary element, a transparent element intermediate said primary and secondary elements and extending across said openings, and a resilient flange formed on each of said elements adjacent the edges of the openings formed therein and disposed at an angle with respect to the plane of said transparent element, and adapted to flexibly support said transparent element in the container top.

In testimony that I claim the foregoing as my own, I have hereto affixed my signature.

WILLIAM RAYMOND BERTELS.